United States Patent
Antonio et al.

(10) Patent No.: US 11,300,427 B2
(45) Date of Patent: Apr. 12, 2022

(54) DETECTION AND ACCOMMODATION OF INTERMITTENT OPEN CIRCUITS ON AN ENGINE SENSOR OF AN AIRCRAFT TURBINE ENGINE

(71) Applicant: SAFRAN AIRCRAFT ENGINES, Paris (FR)

(72) Inventors: Gilian Thierry Antonio, Moissy-Cramayel (FR); Gwenael Thierry Esteve, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 30 days.

(21) Appl. No.: 16/954,725

(22) PCT Filed: Dec. 14, 2018

(86) PCT No.: PCT/FR2018/053297
§ 371 (c)(1),
(2) Date: Jun. 17, 2020

(87) PCT Pub. No.: WO2019/122632
PCT Pub. Date: Jun. 27, 2019

(65) Prior Publication Data
US 2021/0088362 A1  Mar. 25, 2021

(30) Foreign Application Priority Data
Dec. 18, 2017  (FR) ..................................... 1762365

(51) Int. Cl.
*G01D 5/244* (2006.01)
(52) U.S. Cl.
CPC .............. *G01D 5/24466* (2013.01)

(58) Field of Classification Search
CPC ........................... G01D 5/24466; G06F 19/00
See application file for complete search history.

(56) References Cited

U.S. PATENT DOCUMENTS 4,307,451 A * 12/1981 Zagranski ................ F02C 9/28
60/39.281
7,280,941 B2 * 10/2007 Bonanni ............ G05B 23/0254
700/30

FOREIGN PATENT DOCUMENTS

DE  69800948 T2  3/2002
FR  2 960 319 A1  11/2011
(Continued)

OTHER PUBLICATIONS

International Search Report for PCT/FR2018/053297 dated Apr. 3, 2019 [PCT/ISA/210].
(Continued)

*Primary Examiner* — Bryan Bui
(74) *Attorney, Agent, or Firm* — Sughrue Mion, PLLC (57) ABSTRACT

The invention relates to a method for checking a measurement supplied by a sensor (2) of a turbine engine, said method being implemented by a computer (5) of the turbine engine. The method comprises the processing steps of: acquiring a first value of the measurement; comparing an increment with an increment threshold; and transmitting a measurement to be processed to the processing interface (6), said measurement being selected so as to be: equal to the value of an estimation model for the received measurement, if the increment is higher than the increment threshold, or equal to the acquired first value of the measurement if the increment is lower than the increment threshold, the method then comprising additional processing steps.

10 Claims, 6 Drawing Sheets

(56) References Cited

FOREIGN PATENT DOCUMENTS

| FR | 2 988 851 A1 | 10/2013 |
| FR | 2 992 417 A1 | 12/2013 |
| WO | 2016/097633 A1 | 6/2016 |

OTHER PUBLICATIONS

Search Report dated Aug. 23, 2018 by the French Patent Office in application No. 1762365.

* cited by examiner

DETECTION AND ACCOMMODATION OF INTERMITTENT OPEN CIRCUITS ON AN ENGINE SENSOR OF AN AIRCRAFT TURBINE ENGINE

CROSS REFERENCE TO RELATED APPLICATIONS

This application is a National Stage of International Application No. PCT/FR2018/053297 filed Dec. 14, 2018, claiming priority based on French Patent Application No. 1762365 filed Dec. 18, 2017, the entire contents of each of which are herein incorporated by reference in their entireties.

TECHNICAL FIELD

The invention relates to the detection of intermittent contacts on probes forming aircraft turbine engine sensors, also called engine sensors.

The invention relates more specifically to a method of checking a measurement supplied by a two-lane probe forming an engine sensor in order to limit errors caused by intermittent contacts, in the event of a double failure of the probe lanes.

PRIOR ART

An aircraft turbine engine conventionally comprises a large number of moving mechanical parts, the behavior of which is constantly monitored by means of a measurement chain. A measurement chain conventionally comprises a probe comprising two measurement lanes, each communicating with one lane of a computer. A probe can measure a large number of physical parameters in different locations of the turbine engine. These measurements are transmitted to the computer which processes them and conveys to the pilot of the aircraft, or to regulation devices of the turbine engine, a set of information regarding the condition of the turbine engine. In the event of the detection of damage to the turbine engine, the pilot can act accordingly in order to maintain the safety of the aircraft and its passengers. The regulation devices of the turbine engine can also act on the behavior of the turbine engine in order to manage the damage.

Most current measurement chains are electronic. The measurements are transmitted to the computer in the form of electrical signals. The computer lanes are therefore subjected to a timed electrical signal (typically a voltage) representing the measurement acquired by the probe. This technology has been proven on many aircraft engines and offers a rapid response time conforming to regulation requirements. However, turbine engine measurement chains operate in an environment in which strong thermal and vibratory stresses exist. These constraints frequently cause breakdowns of the intermittent contact type. An intermittent contact is an intermittent and very brief opening of an electrical circuit, or an unintentional ground return. These phenomena are observed in particular when the probe connectors loosen or erode, or when the sensitive elements of the measurement lanes exhibit faults. The intermittent open circuits also appear when the electrical wires connecting the sensitive elements of the probe to the electronic connector set of the measurement chain break, or when poor assembly of the sensitive elements into the body of the probe makes them sensitive to vibrations and to breakage.

After having acquired the measurement, each lane of the computer exchanges with the other lane the value of the measurement as well as its electrical status, for example the detection of open circuits or short circuits. From then on, the computer is able to elaborate a measurement to be transmitted to a processing interface which generates information useful to the pilot or to the regulation devices. Moreover, for certain measured parameters, the computer disposes of a model for estimating the measurement constructed based on the acquisition of other parameters. In case of conflicts between the measurements transmitted to the two computer lanes, the estimation model allows the computer to arbitrate to transmit the more relevant measurement to the processing interface.

The phenomenon of an intermittent open circuit can have considerable consequences. In fact, it is customary that, in the case of opening of the electrical circuit on one of the measurement lanes, the computer imposes a very high received measurement value, called the saturation value. This mechanism allows invalidating the information received on a computer lane if the opening of the circuit is permanent, i.e. if the measurement lane has broken down.

Figure 1:
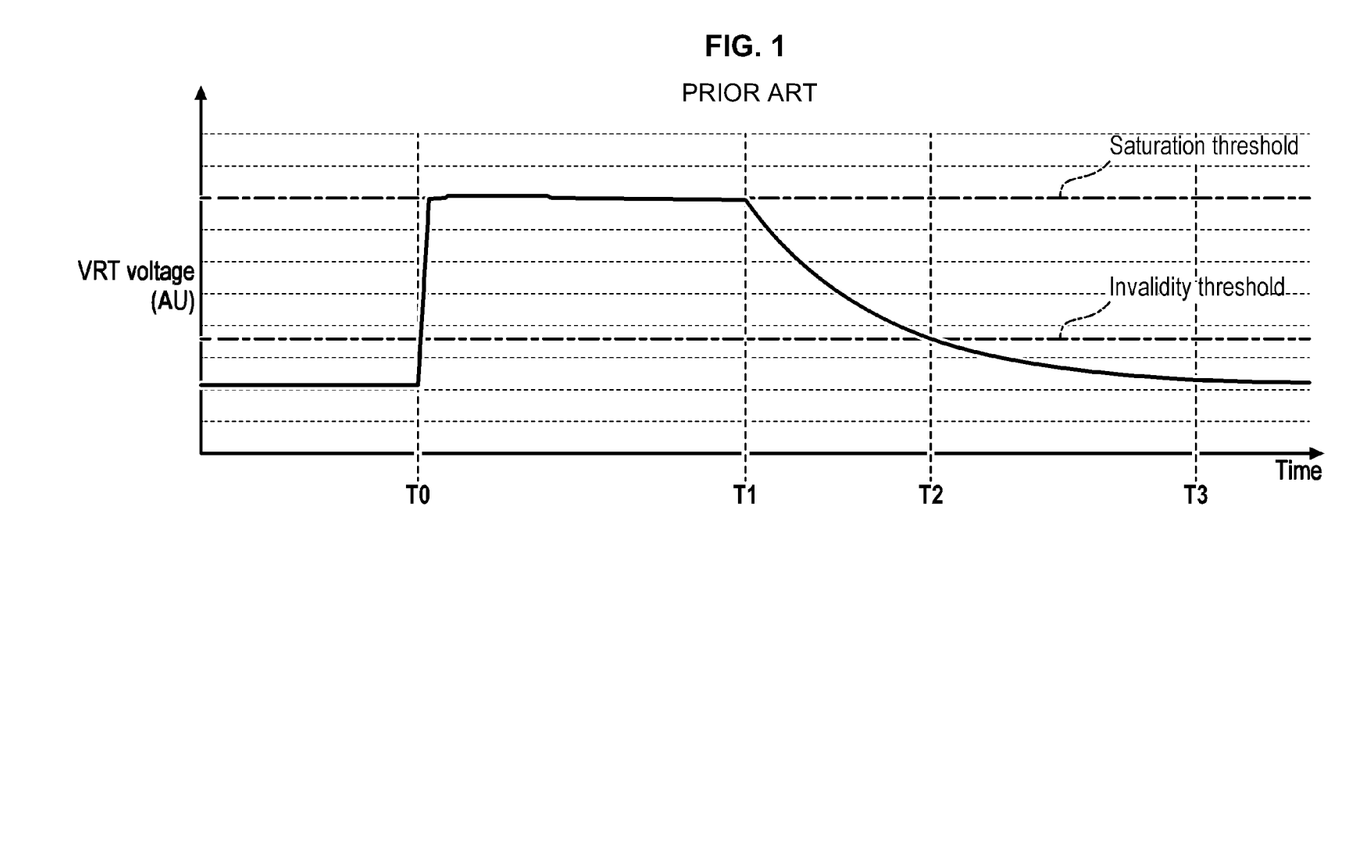
FIG. 1, already described, illustrates a phenomenon of electrical relaxation on a signal acquired by a computer lane from a circuit which is the seat of intermittent openings, FIG. 2, also already described, illustrates a signal acquired by a computer lane from a circuit which is the seat of a phenomenon of intermittent contact and the corresponding invalidation signal.

But as illustrated in FIG. 1, the inertia of the electronic circuits comprised in the measurement chain is such that the computer lanes are subjected to phenomena of electrical relaxation. FIG. 1 shows the timed evolution of a voltage supplied by a temperature probe of the thermocouple type, also called VRT (or variable resistance transducer) voltage, on one lane of the computer which detects, at time T0, an open circuit on the measurement chain. The calculator then makes the value of the VRT voltage change to the saturation threshold, which is much higher than the invalidity threshold, at which the signals originating from a probe lane are ignored. At a subsequent time T1, the electrical circuit is closed again. The VRT voltage then drops again progressively to the level of the signal communicated by the corresponding probe lane. Only, this phenomenon is too slow compared to the processing frequency of the interface. It is necessary in fact to wait until time T2, subsequent to T1, to re-cross the invalidity threshold, then time T3, subsequent to T2, to acquire a correct measurement value. But the processing interface uses values of the VRT voltage between T2 and T3, because these are less than the invalidity threshold, although these values are erroneous. An unintentional opening of a circuit therefore causes the return of erroneous information to the regulation devices of the turbine engine, or to the pilot.

Figure 2:
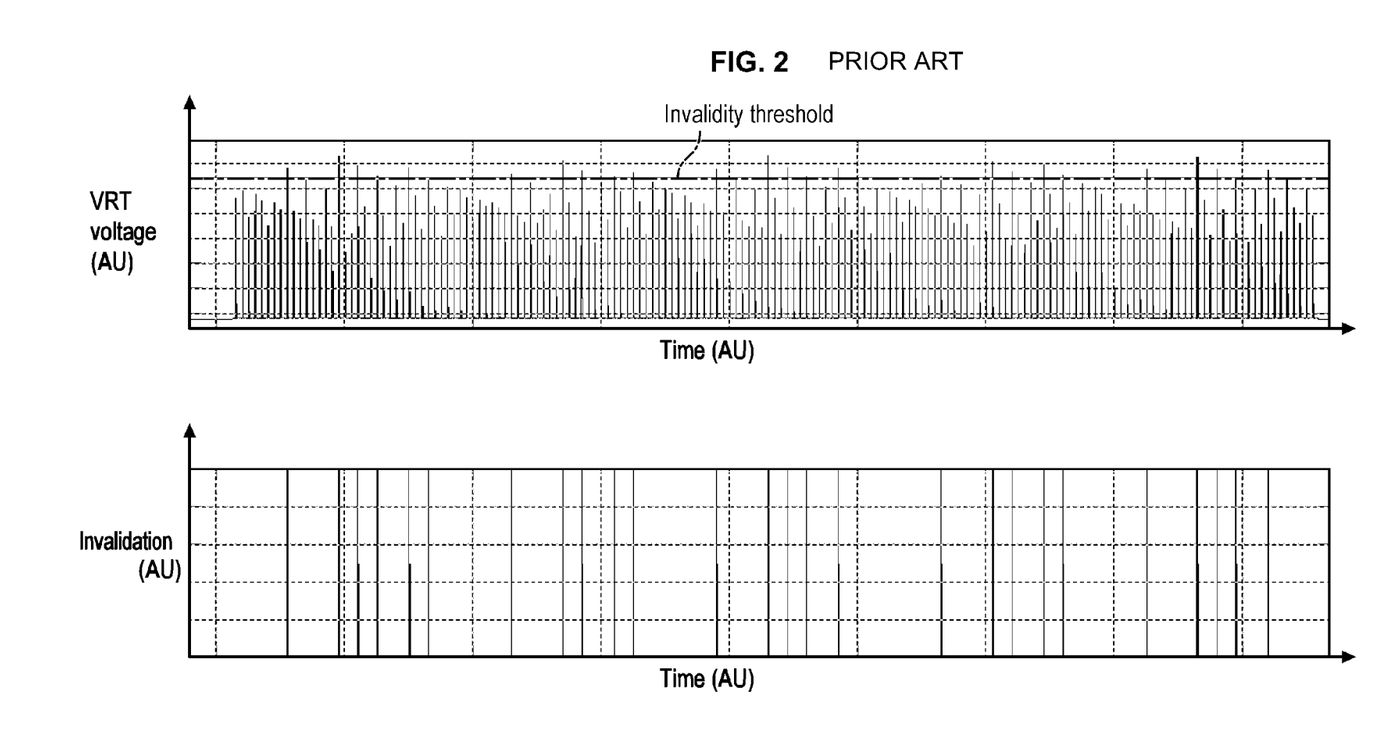

In the case of intermittent openings, the brevity of the electrical openings leads to consequent measurement jumps, without however leading to the invalidity of the computer lane, because the VRT voltage does not have the time to attain the invalidity threshold. FIG. 2 illustrates a VRT voltage curve displaying a signal originating in an intermittent circuit phenomenon, and a corresponding invalidity curve, which displays the value 1 when a value is evaluated as non-valid by the computer. In the case of intermittent openings, the intensity of the signal can exceed the invalidity threshold or not, depending on the duration of opening of the circuit. If an opening causes a peak in the signal, but this measurement jump does not attain the invalidity threshold, the processing interface receives the measurement. But, this value being of the same order of magnitude as during breakdowns, the information sent by the processing interface is consequently erroneous.

By way of an example, engine stoppages in flight have already been observed, caused by intermittent contacts which have caused large fluctuations in the measurement acquired by an engine sensor, the value of which intervened in the calculation of the angle of the compressor vanes. The loss of control of the compressor then caused surging and oscillations of the engine speed, forcing the pilot to slow down, then completely shut down the engine. In this case, it has been shown that one of the two computer lanes had already been considered invalid by the computer. Consequently, the appearance of intermittent contacts on the valid lane caused an oscillation in the measurement transmitted to the processing interface between a high valid erroneous value and the value of an estimation model, causing the loss of control of the compressor.

Numerous methods of detection of intermittent open circuits have already been proposed.

Known for example is a detection method which comprises a step of comparison between the measurement acquired on the valid computer lane and the value of an estimation model, to ensure the plausibility of the measurement. However, this detection is not very effective, because the comparison threshold is very high in order to avoid false detections, which does not allow sufficient reaction to rapid variations of the measurement which can, for example, cause turbine engine surging.

Also known from document FR 2 992 417 is a method for checking an engine sensor implementing calculation steps on the measurements of the two sensor lanes, as well as the updating of an indicator depending on the results of the calculation steps. The evolution of the indicator is then checked to detect the breakdown in one or the other of the sensor circuits.

However, these detection methods do not allow the adaptation of the measurement chain to the presence of intermittent open circuits in the case of a double breakdown. What is meant by double breakdown is the one of the two lanes is declared invalid, and the other is the seat of intermittent currents, or that the two lanes are the seat of intermittent currents.

Therefore, there exists a need to propose a method of checking measurements acquired by a computer and supplied by an engine probe with two measurement lanes, in order to detect the phenomenon of intermittent open circuits and to accordingly adapt the measurement chain.

BASIS OF THE INVENTION

One goal of the invention is to detect intermittent open circuits in a dynamic and effective manner.

Another goal of the invention is to propose a method of checking the measurement acquired by a probe forming a turbine engine sensor which has better reactivity to the phenomenon of intermittent open circuits.

Another goal of the invention is to preserve the consistency of the measurement chain during the operation of the turbine engine, this despite a double breakdown of the lanes of a probe forming an engine sensor.

In this regard, the invention proposes a method of checking a measurement supplied by a probe forming an engine sensor of an aircraft turbine engine, and transmitted to an interface for processing the measurement, the probe comprising a measurement lane, said method being implemented by a computer of the turbine engine comprising a computer lane connected to the measurement lane of the probe, the method comprising the processing steps of:
  acquiring a first value of the measurement on the computer lane,
  comparing an increment with an increment threshold,
  transmitting to the processing interface a measurement to be processed which is selected:
    equal to the value of the model for estimating the measurement received, if the increment is greater than the increment threshold, or
    equal to the first value of the measurement acquired, if the increment is less than the increment threshold.

Thanks to the presence of an increment, the computer is able to completely ignore a measurement lane if the latter is the seat of a phenomenon of intermittent contacts, independently of the state of other possible measurement lanes. This makes the computer robust to the appearance of intermittent contacts on any of the measurement lanes, of the computer lanes or of the electrical connections connecting the latter together. Thus, in the case of invalidity of a measurement lane, checking the redundant valid measurement lane remains possible, this possibly finally being ignored to the benefit of an estimation model if the intermittent contacts persist there. Moreover, the value of the increment can then advantageously be raised at the end of an aircraft flight mission in order to determine the intensity of the phenomenon of intermittent contacts on the checked measurement lane.

Alternatively, but optionally, the method according to the invention can further comprise the following features:
  if the increment is less than the increment threshold, the method then comprises additional processing steps of:
    acquiring a second measurement value on the computer lane, the second value being successive to the first value by a given time interval,
    comparing of the deviation between, on the one hand, the first acquired value, and on the other hand the corresponding value of the estimation model, and a measurement validity threshold,
    comparing the deviation between, on the one hand, the time derivative between the two acquired values, and on the other hand the time derivative between the two corresponding values of the estimation model, and a measurement time derivative validity threshold, and
    updating the increment depending on the result of the comparison steps,
  during the updating step:
    if the deviation between, on the one hand, the first acquired signal value, and on the other hand the corresponding value of the estimation model, is greater than the measurement validity threshold, then the increment is increased by 1, otherwise the increment remains unchanged, and
    if the deviation between, on the one hand, the time derivative between the two acquired values, and on the other hand the time derivative between the two corresponding values of the estimation model, is greater than the measurement time derivative validity threshold, then the increment is increased by 1, otherwise the increment remains unchanged,
  the probe comprises two measurement lanes, respectively connected to two computer lanes, the method comprising the initial steps of:
    acquiring a measurement value,
    comparing the acquired value with an invalidity threshold,
    updating an additional increment depending on the results of the comparison step, and
    determining the validity of one of the two lanes depending on the additional updated increment, the initial steps being implemented in parallel on each of the computer lanes, the initial steps being repeated successively until one of the lanes is determined to be invalid, the processing steps then being implemented on the lane determined to be valid, during the updating step, the additional increment is increased by 1 if the acquired value is greater than the invalidity threshold, and remains unchanged otherwise, a lane is determined to be invalid if:
  following the updating step, the additional increment exceeds the increment threshold, and
  the last increase of the additional increment is due to the fact that the last value acquired on said computer lane is greater than the invalidity threshold, it further comprises a preliminary step of receiving a first and a second measurement value of a measurement estimation model, said values being synchronized to the acquired values, it further comprises prior steps of defining a measurement validity threshold, a measurement time validity threshold, an increment and an additional increment, an increment threshold and an invalidity threshold, the increment threshold is 20, and the probe measures the temperature at the high-pressure compressor inlet, the measurement validity threshold is comprised between 15K and 45K, preferably between 25K and 35K, for example 30K, and the measurement time derivative validity threshold is comprised between 120K/s and 180K/s, preferably between 140K/s and 160K/s, for example 150 K/s.

The invention also applies to a computer program product comprising code instructions for the execution of a checking method as described previously, when this method is implemented by at least one computing unit.

RAPID DESCRIPTION OF THE FIGURES

Other features, goals and advantages of the present invention will appear upon reading the detailed description that follows and with reference to the appended drawings, given by way of non-limiting examples and in which.

DETAILED DESCRIPTION OF THE INVENTION

With reference to the figures, an exemplary embodiment of a method E for checking a measurement acquired by a probe forming a turbine engine sensor will now be described.

Figure 3:
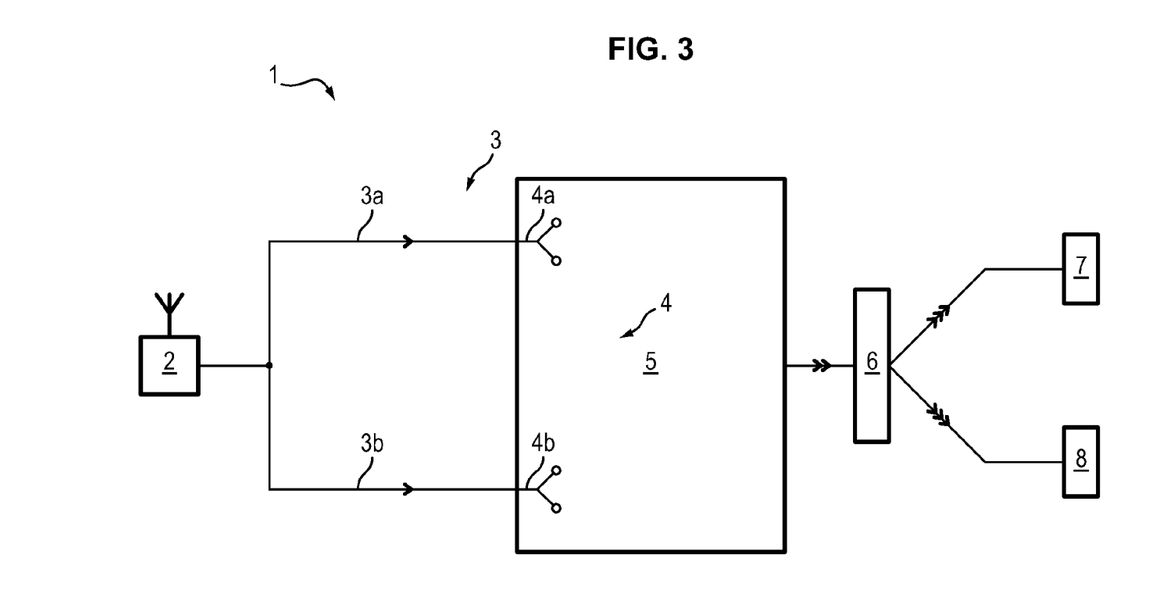
FIG. 3 illustrates an exemplary embodiment of a measurement chain configured to implement a measurement checking method.

With reference to FIG. 3, a method E of this type can in particular be implemented within a measurement chain 1 comprising a probe 2 forming an engine sensor, said probe 2 comprising a measurement lane 3, and a computer 5, said computer 5 comprising a computer lane 4 connected to the measurement lane 3 of the probe 2. The measurement lane 3 acquires successive measurements representing a physical quantity, and transmits a timed signal representing these measurements to the computer lane 4. The computer 5 acquires the timed electrical signal, and elaborates a value of the measurement to be transmitted to a processing interface 6. The processing interface 6 returns information relative to the value of the measurement transmitted by the computer 5, and connected to a condition of the turbine engine, to the pilot 7 or a to a regulation system 8 of the turbine engine.

The probes 2 forming a sensor for which the checking method E is useful are in particular those for which an estimation mode of the measurement acquired is practicable. By way of purely illustrative examples, probes 2 of this type are: the temperature sensor at the inlet of the high-pressure compressor, the exhaust gas temperature sensor (or EGT), or the position sensors (or LVDT for linear variable differential transformer). Advantageously the checking method E is applicable to temperature measurements, such as the temperature of turbine engine gaseous or liquid fluids such a lubricating oil or fuel. For gaseous fluids at high temperature, for example exhaust gases, a temperature probe of the thermocouple type is particularly suited.

Figure 4:
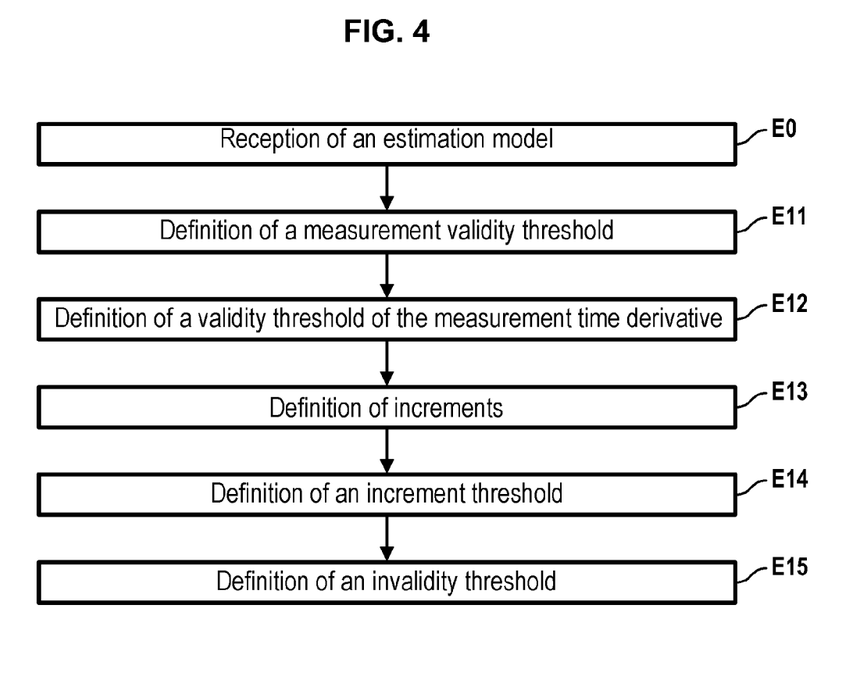
FIG. 4 is a functional diagram of the previous steps of an exemplary embodiment of the checking method according to the invention.

With reference to FIG. 4, during a first preliminary step E0 the computer 5 receives a measurement value $S_{est}$ from an estimation model of the measurement acquired by the probe 2. If necessary, as will be explained later, successive measurement values $S_{est}$, $S_{est2}$ of an estimation model of the measurement acquired by the probe 2 can also be received.

The modeled value can for example have been elaborated from other measurement acquired elsewhere. This model can have been estimated by the computer 5, or supplied by the user or the constructor and, if necessary, stored in a memory of the computer 5.

Either way, the measurement value of the estimation model is representative of a measurement of the same physical quantity as that measured by the probe 2. In addition, the estimation model is synchronized with the true electrical signal transmitted by the probe 2 on the computer 5 lane. In this regard, each measurement value extracted from the transmitted signal has a corresponding value within the estimation model, the computer 5 being configured to establish this correspondence between the measurement values successively extracted from the acquired signal and the successive measurement values of the estimation model.

Still with reference to FIG. 4, during previous steps a measurement validity threshold $S_{VM}$ is defined E11, and validity threshold of the measurement time derivative $S_{VDTM}$ is defined E12, and increment I, the value of which is zero by default, is defined E13, and an increment threshold $S_I$ is defined E14.

Certain or the totality of measurement validity thresholds $S_{VM}$ and of measurement time derivative $S_{VDTM}$ can be elaborated by studying operating cycles of the turbine engine during flights of the aircraft with no breakdown of the probe 2, i.e. without the appearance of the phenomenon of intermittent circuits, the value of the model being able to be reconstructed based on available flight data and compared with the selected value of the probe 2. When the sampling of the available flight data is insufficient to allow the elaboration of a threshold $S_{VM}$, $S_{VDTM}$, development test data can possibly be used to elaborate the threshold $S_{VM}$, $S_{VDTM}$. These thresholds $S_{VM}$, $S_{VDTM}$ can be modified between two flights of the aircraft by a new elaboration depending on the new flight data available. The recovery of measurement data by a measurement chain 1, and comparison with estimation data by the model received during these cycles of operation, allow measuring a maximum observable deviation between the measured signal and the model signal. This deviation corresponds to real variations in the physical quantity during the operation of a turbine engine. Consequently, it is sufficient to propose a sufficiently great margin relative to this maximum observable deviation to deduce from it the validity thresholds $S_{VM}$, $S_{VDTM}$. It is also possible to recover data from test engines operating in nominal configuration. The variations in the physical quantity observed thus allow discriminating evolutions with a physical origin (i.e. logical during operation) from evolutions of electrical origin (i.e. intermittent contacts).

Advantageously, in the case where the physical quantity measured by the probe 2 is the high pressure compressor inlet temperature, the Applicant has observed that an optimal validity threshold $S_{VM}$ of the measurement is comprised between 15K and 45K, preferably between 25K and 35K, for example 30K. In addition, in this case, an optimal validity threshold of the measurement time derivative $S_{VDTM}$ is comprised between 120K/s and 180K/s, preferably between 140K/s and 160K/s, for example 150 K/s.

Figure 5:
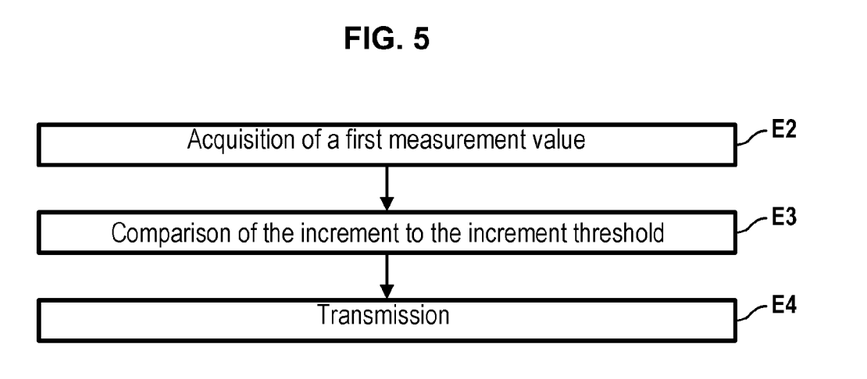
FIG. 5 is a functional diagram of the processing steps of an exemplary embodiment of the checking method according to the invention.

With reference to FIG. 5, once the previous steps of receiving an estimation model E0 and of defining E11, E12, E13, E14 implemented, the checking method E provides for processing steps E2, E3, E4 of the signal received on the computer lane 4. These processing steps E2, E3, E4 are implemented only when the turbine engine is started, and the initialization of the computer 5 is terminated. These two conditions guarantee that the estimation model of the measurement acquired by the probe, received during the previous step E0, is accurate.

During a first processing step E2, a first measurement value $S_{acq}$ is extracted from a signal representing the measurement acquired on the computer lane 3, said value $S_{acq}$ corresponding to the value $S_{est}$ of the estimation model, as previously described.

During a second processing step E3, the increment I is compared to the increment threshold $S_I$.

Figure 6:
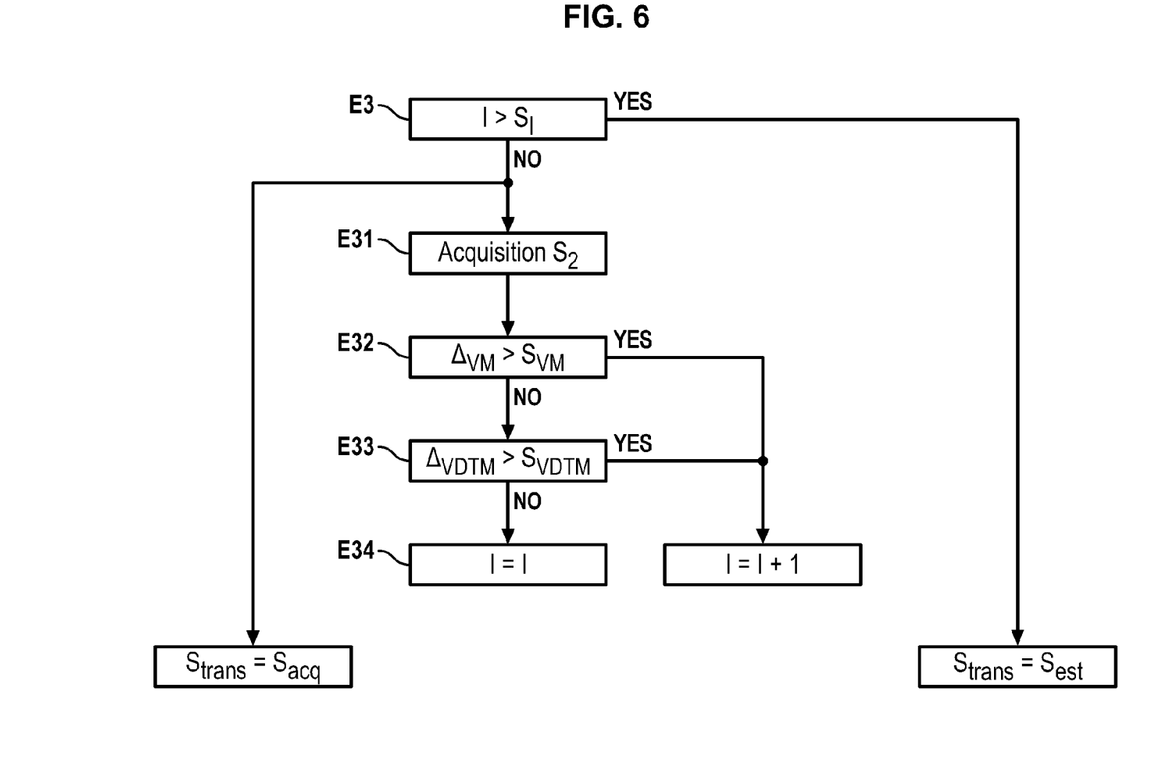
FIG. 6 is a flowchart detailing the additional processing steps of an exemplary embodiment of the checking method according to the invention.

During a third processing step E4, a measurement value to be processed is transmitted to the processing interface 6 which returns information relative to the condition of the turbine engine to the pilot 7 or to a regulation device 8 of the turbine engine. As can be seen in FIG. 6, the value of the measurement to be processed depends on the result of the comparison step E3.

If the increment I is greater than the increment threshold $S_I$, the transmitted value $S_{trans}$ is the value of the estimation model $S_{est}$ corresponding to the first acquired value $S_{acq}$ extracted from the signal.

If the increment I is less than the increment threshold $S_I$, the transmitted value $S_{trans}$ is the first acquired value $S_{acq}$, and the checking method E implements additional processing steps E31, E32, E33, E34, before implementing the third processing step E4.

With reference to FIG. 6, during a first additional processing step E31, a second value $S_{acq2}$ of the signal representing the measurement on the computer lane 4 is acquired, the second value $S_{acq2}$ being successive to the first value $S_{acq}$. These successive values $S_{acq}$, $S_{acq2}$ can be acquired in a given time interval T. Advantageously, this time interval T is a multiple of the period of the internal clock of the computer 5, called the "real time clock" (or "RTC").

During a second additional processing step E32, the deviation $\Delta_{VM}$ between, on the one hand, the first acquired value $S_{acq}$, and on the other hand, the corresponding value of the model signal $S_{est}$, is compared to the measurement validity threshold $S_{VM}$.

During a third additional processing step E33, the deviation $\Delta_{VDTM}$ between, on the one hand, the time derivative between the two acquired values $S_{acq}$, $S_{acq2}$, and on the other hand, the time derivative between two corresponding successive values $S_{acq}$, $S_{acq2}$ of the estimation model, is compared to the validity threshold of the measurement time derivative $S_{VDTM}$.

As can be seen in FIG. 6, depending on the results of the second E32 and the third E33 additional processing steps, a fourth additional processing step E34 of updating the increment is implemented.

If the deviation $\Delta_{VM}$ between, on the one hand, the first acquired signal value $S_{acq}$, and on the other hand, the corresponding value $S_{est}$ of the estimation model, is greater than the measurement validity threshold $S_{VM}$, then the increment I is increased by 1, otherwise the increment remains unchanged.

If the deviation $\Delta_{VDTM}$ between, on the one hand, the time derivative between the two acquired values $S_{acq}$, $S_{acq2}$, and on the other hand the time derivative between the two corresponding values of the estimation model, is greater than the measurement time derivative validity threshold $S_{VDTM}$, then the increment I is increased by 1, otherwise the increment I remains unchanged.

Two embodiments of the checking method E previously described will now be detailed, with reference to FIG. 3, the second embodiment being generally favored in the implementation of the method E within the turbine engine.

The measurement chain 1 comprises a probe 2 forming an engine sensor, said probe 2 comprising two redundant measurement lanes 3a, 3b, and a computer 5, said computer comprising two computer lanes 4a, 4b connected to each of the measurement lanes 3a, 3b of the probe 2. Each of the measurement lanes 3a, 3b acquires the successive measurements representing a physical quantity, and transmits a time-varying electrical signal representing these measurements to each of the computer 5 lanes 4a, 4b. The computer 5 acquires time-varying electrical signals and transmits two respective measurement values to a processing interface 6. The processing interface 6 elaborates information connected to a condition of the turbine engine from the two values transmitted, and returns it to the pilot 7 or to a regulation system 8 of the turbine engine.

In a first embodiment, one of the measurement lanes 3a is invalid. Consequently, processing steps E2 to E4 are implemented on the signal acquired by the valid measurement lane 3b. The previous steps of receiving an estimation model E0 and of definition E1 are implemented as previously described, and the increment threshold $S_I$ is set to 20. Alternatively, the previous steps E0 and E1 can have been implemented during another operating cycle of the turbine engine, or during engine tests carried out during maintenance or during tests prior to acceptance into active service of the turbine engine. The results of these steps E0, E1 were then stored, for example in a computer 5 memory. In any case, once the turbine engine is in operation, a first step E2 is implemented. During this step E2, the values of the signal representing the measurement supplied by the probe 2 are therefore acquired on the valid computer lane 4b, processed successively by the computer 5, and transmitted to the processing interface 6. Each measurement value is spaced from the following value by a time interval T corresponding to the period of the clock of the computer 5.

In a first time range, the increment I having been declared zero by default, additional processing steps E31 to E34 are implemented. Each time the measurement validity threshold $S_{VM}$ or the measurement time derivative validity threshold $S_{VDTM}$ is passed, the increment I is increased by 1. These passages are essentially due to the presence of intermittent contacts on the valid lane 3b -4b. When the increment I reaches the value of the increment threshold $S_I$, the double breakdown is declared, and the computer uses the value of the estimation model $S_{est}$ until the end of the flight mission.

In a second embodiment of the checking method E, the two probe lanes 3a, 3b are valid a priori. The checking method E therefore allows detecting the simultaneous, or nearly, appearance of intermittent contacts one and/or the other of the lanes 3a, 3b, and accordingly adapting the measurement chain 1.

With reference to FIG. 4, during a preliminary additional step E15, an invalidity threshold $S_{INV}$ is defined. This invalidity threshold $S_{INV}$ is defined as is customary in the checking method of the prior art. It consists of the value of the measurement received, based on which the computer 5 ignores the signal received on one of the lanes 3a -4a, 3b -4b by estimating that an opening of the electrical circuit is present on one of the lanes 3a -4a, 3b -4b. The openings of the electrical circuit comprise in particular a short circuit or an intermittent open circuit. However, a value of the measurement exceeding an acquisition interval of the computer 5 (typically a measurement value that is physical absurd) is also considered as an opening of the electrical circuit.

The preliminary steps E11, E12, E13, E14 are also implemented as described previously, and the increment threshold $S_I$ is set to 20 occurrences. In addition, during the preliminary step of defining the increment E13, an additional increment $I_S$ is defined, of which the value is zero by default.

Figure 7:
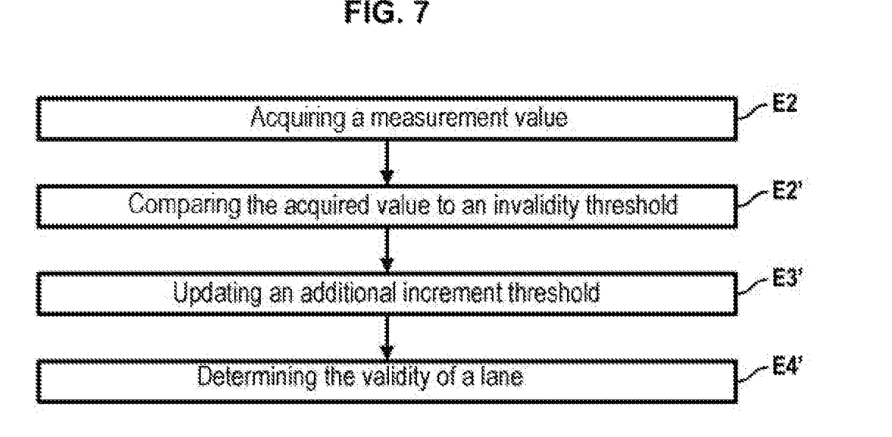
FIG. 7 is a functional diagram of the initial steps of an exemplary embodiment of the checking method according to the invention.

Hereafter, with reference to FIG. 7, initial processing steps are implemented in parallel on each of the computer lanes 4a, 4b.

During a first initial step, the first processing step E2 is implemented in parallel based on each of the signals received on the two computer 5 lanes 4a, 4b. Each measurement acquired is further compared E2' to the value of the invalidity threshold $S_{INV}$, and the additional increment $I_S$ is accordingly updated E3'. More precisely, if one of the measurement values acquired on one of the lanes exceeds the invalidity threshold $S_{INV}$, the additional increment $I_S$ is increased by 1, and remains unchanged otherwise.

When the additional increment $I_s$ exceeds the increment threshold $S_I$, the last lane 3a -4a, 3b -4b having caused an increase in the value of the additional increment $I_s$ is determined to be invalid, and the situation then becomes similar to the first embodiment of the checking method E described previously. The initial steps are therefore repeated successively until one of the lanes 3a -4a, 3b -4b is declared invalid. Thereafter, the processing steps E2, E3, E4 of the checking method E are implemented on the lane determined to be valid.

Alternatively, a lane 3a -4a, 3b -4b is determined to be invalid if its cumulative breakdown time exceeds a predetermined breakdown threshold $S_P$, for example 30 seconds. A breakdown threshold $S_P$ of this type may have been defined during the preliminary steps E15, at the same time as the invalidity threshold $S_{INV}$. The cumulative breakdown time can further be obtained by the computer 5 by multiplying the number of successive increases of the increment I on a lane 3a -4a, 3b -4b by the acquisition time interval between two successive measurements $S_{acq}$.

The different steps of the checking method E described previously, according to one of the embodiments described, can be implemented by a set of controllable means, or modules, for this purpose. In this regard, a computer program product comprising code instructions for the execution of a checking method E of this type can be used, when the method E is implemented by a computer unit. Likewise, the method E being able to be implemented by a set of means comprising computing equipments, a computer program product of this type can be stored on a storage means readable by computing equipment.

The invention claimed is:

1. A method comprising:
    acquiring a first measurement value supplied by a probe forming an engine sensor of an aircraft turbine engine;
    comparing an increment with an increment threshold;
    transmitting to a processing interface a measurement to be processed which is selected:
        equal to a first value of an estimation a model estimating the first measurement value, when the increment is greater than the increment threshold, or
        equal to the first measurement value, acquired when the increment is less than the increment threshold;
    the method further comprising, when the increment is less than the increment threshold:
    after a given time interval following the acquiring of the first measurement value, acquiring a second measurement value supplied by the probe;
    comparing a deviation between the first measurement value and the first value of the estimation model, and a measurement validity threshold;
    comparing a deviation between a time derivative between the first measurement value and the second measurement value and a time derivative between the first value of the estimation model and a second value of the estimation model estimating the second measurement value, and a measurement time derivative validity threshold, and updating the increment accordingly.

2. The method according to claim 1, wherein updating the increment comprises:
    if the deviation between the first measurement value and the first value of the estimation model is greater than the measurement validity threshold, increasing the increment by 1, otherwise leaving the increment unchanged; and
    if the deviation between the time derivative between the first measurement value and the second measurement value, and the time derivative between the first value of the estimation model and the second value of the estimation model, is greater than the measurement time derivative validity threshold, increasing the increment by 1, otherwise leaving the increment unchanged.

3. The method according to claim 1, further comprising:
    comparing the first measurement value with an invalidity threshold
    updating an additional increment accordingly and
    determining a validity of one of two lanes respectively connecting measurement lanes of the probe and computer lanes of a computer of the turbine engine accordingly;
    wherein acquiring the first measurement value, comparing the first measurement value with an invalidity threshold, updating the additional increment and determining the validity of the two lanes are repeated successively on each of the computer lanes until one of the two lanes is determined to be invalid, acquiring the first measurement value, comparing the increment with the increment threshold and transmitting to the processing interface the measurement to be processed being then implemented on a lane of the two lanes determined to be valid.

4. The method according to claim 3, wherein the additional increment is increased by 1 if the first measurement value is greater than the invalidity threshold, and remains unchanged otherwise.

5. The method according to claim 4, wherein a lane of the two lanes is determined to be invalid if:
the additional increment exceeds the increment threshold after the additional increment having been updated, and
a last increase of the additional increment is due to a last first measurement value acquired (having been greater than the invalidity threshold.

6. The method according to claim 1, further comprising receiving the first value of the estimation model and the second value of the estimation model prior to acquiring the first measurement value and comparing the increment with the increment threshold, the first value of the estimation model and the second value of the estimation model being synchronized to the first measurement value and the second measurement value.

7. The method according to claim 1, further comprising defining the measurement validity threshold, the time validity threshold, increment, the additional increment, the increment threshold and an invalidity threshold prior to acquiring the first measurement value and comparing the increment with the increment threshold.

8. The method according to claim 1, wherein the increment threshold is 20.

9. The method according to claim 1, wherein the measurement supplied by the probe is a temperature at high-pressure compressor inlet of the aircraft turbine engine, the measurement validity threshold being comprised between 15K and 45K and the measurement time derivative validity threshold comprised between 120K/s and 180K/s.

10. A non-transitory computer readable medium storing computer program code which, when accessed and executed by a computing unit, causes the computing unit to at least:
acquire a first measurement value supplied by a probe forming an engine sensor of an aircraft turbine engine;
compare an increment with an increment threshold; and
transmit to a processing interface a measurement to be processed which is selected:
equal to a first value of an estimation a model estimating the first measurement value, when the increment is greater than the increment threshold, or
equal to the first measurement value, acquired when the increment is less than the increment threshold;
wherein the computer program code when accessed and executed causes the computing unit to at least, when the increment is less than the increment threshold:
after a given time interval following the acquiring of the first measurement value, acquire a second measurement value supplied by the probe;
compare a deviation between the first measurement value and the first value of the estimation model, and a measurement validity threshold; and
compare a deviation between a time derivative between the first measurement value and the second measurement value and a time derivative between the first value of the estimation model and a second value of the estimation model estimating the second measurement value, and a measurement time derivative validity threshold, and update the increment accordingly.

\* \* \* \* \*